(12) United States Patent
Hjelm et al.

(10) Patent No.: US 12,109,676 B2
(45) Date of Patent: Oct. 8, 2024

(54) BATTERY ADAPTER ASSEMBLY AND HAND-HELD POWER TOOL

(71) Applicant: HUSQVARNA AB, Huskvarna (SE)

(72) Inventors: Johan Hjelm, Bankeryd (SE); Pär Martinsson, Jönköping (SE); Filip Stenow, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 180 days.

(21) Appl. No.: 17/765,673

(22) PCT Filed: Oct. 1, 2020

(86) PCT No.: PCT/EP2020/077480
§ 371 (c)(1),
(2) Date: Mar. 31, 2022

(87) PCT Pub. No.: WO2021/064086
PCT Pub. Date: Apr. 8, 2021

(65) Prior Publication Data
US 2022/0339774 A1      Oct. 27, 2022

(30) Foreign Application Priority Data
Oct. 2, 2019   (SE) .................................... 1951121-1

(51) Int. Cl.
*B25F 5/02*      (2006.01)
*H01M 50/267*      (2021.01)

(52) U.S. Cl.
CPC ............. *B25F 5/02* (2013.01); *H01M 50/267* (2021.01); *H01M 2220/30* (2013.01)

(58) Field of Classification Search
CPC .... B25F 5/02; H01M 50/267; H01M 2220/30
See application file for complete search history.

(56) References Cited

U.S. PATENT DOCUMENTS 2,496,612 A    2/1950   Wilhide
2,529,567 A    11/1950  Neck
(Continued)

FOREIGN PATENT DOCUMENTS

CN    102386348 A    3/2012
CN    102812612 A    12/2012
(Continued)

OTHER PUBLICATIONS

International Search Report and Written Opinion in International patent application No. PCT/EP2020/077480, dated Nov. 5, 2020.
(Continued)

*Primary Examiner* — Lucas E. A. Palmer
(74) *Attorney, Agent, or Firm* — Burr & Forman LLP

(57) ABSTRACT

A battery adapter assembly (1) is disclosed for an electrically driven hand-held power tool (3). The battery adapter assembly (1) comprises a battery adapter (5) configured to be connected to a battery connection interface (7) of the power tool (3), and a power cord (9) comprising a first end (11) connected to the battery adapter (5) and a second end (12) for connection to a power supply (27). The power cord (9) comprises at least a first fixation element (21) configured to fixate the power cord (9) to a cord holding arrangement (15) of the power tool (3). The present disclosure further relates to a hand-held power tool (3).

23 Claims, 4 Drawing Sheets

(56) References Cited

U.S. PATENT DOCUMENTS

| | | | |
|---|---|---|---|
| 2,617,971 A | 11/1952 | Stack | |
| 2,945,085 A * | 7/1960 | Billups | H02G 3/083 174/153 G |
| 3,123,662 A * | 3/1964 | Fink | H02G 3/065 16/2.5 |
| 4,723,822 A | 2/1988 | Merdic | |
| 4,835,410 A * | 5/1989 | Bhagwat | H02J 7/02 307/64 |
| 5,172,773 A | 12/1992 | Meister et al. | |
| 5,394,592 A * | 3/1995 | Quick | B25F 5/00 24/17 AP |
| 5,711,055 A * | 1/1998 | Quick | H01R 13/6392 24/3.13 |
| 5,993,249 A | 11/1999 | Benson, Jr. | |
| 6,152,639 A * | 11/2000 | Hsu | B25F 5/00 439/446 |
| 6,240,967 B1 | 6/2001 | Levert et al. | |
| 6,540,545 B1 * | 4/2003 | Itakura | B24B 23/005 310/50 |
| 6,683,396 B2 | 1/2004 | Ishida et al. | |
| 6,683,439 B2 * | 1/2004 | Takano | H02J 7/0048 320/132 |
| 6,826,837 B2 | 12/2004 | Todd | |
| 7,629,766 B2 * | 12/2009 | Sadow | H02J 7/0044 173/217 |
| 9,308,637 B2 | 4/2016 | Tsuchiya et al. | |
| 9,463,564 B2 * | 10/2016 | Macauda | H01R 25/003 |
| 10,328,600 B2 | 6/2019 | Kachi et al. | |
| 2002/0158516 A1 * | 10/2002 | Nishikawa | H02J 7/0042 307/150 |
| 2003/0011245 A1 * | 1/2003 | Fiebig | H02J 7/00036 307/48 |
| 2003/0182749 A1 * | 10/2003 | Boyer | B24B 41/042 15/97.1 |
| 2004/0147160 A1 * | 7/2004 | Weiss | H01R 13/5837 439/457 |
| 2004/0166730 A1 | 8/2004 | Wascow et al. | |
| 2004/0232892 A1 * | 11/2004 | Aradachi | H02J 7/0068 320/150 |
| 2005/0280394 A1 * | 12/2005 | Kubale | H02J 7/0044 320/114 |
| 2007/0114141 A1 | 5/2007 | Mikesell et al. | |
| 2007/0132428 A1 * | 6/2007 | Wise | B25F 5/00 320/114 |
| 2007/0224492 A1 * | 9/2007 | Scott | H01M 50/247 429/99 |
| 2008/0012526 A1 | 1/2008 | Sadow | |
| 2008/0083079 A1 * | 4/2008 | Starrette | B24B 29/02 15/97.1 |
| 2009/0000821 A1 * | 1/2009 | Parks | B27B 5/29 174/665 |
| 2009/0004908 A1 * | 1/2009 | Ceroll | B27B 5/29 439/447 |
| 2009/0104861 A1 * | 4/2009 | Van Der Linde | G05G 5/06 451/344 |
| 2011/0121782 A1 | 5/2011 | Marsh et al. | |
| 2011/0147031 A1 * | 6/2011 | Matthias | B25F 5/02 173/171 |
| 2011/0162219 A1 * | 7/2011 | Okouchi | B27B 17/00 173/217 |
| 2011/0197389 A1 * | 8/2011 | Ota | H01M 10/488 429/121 |
| 2011/0279090 A1 * | 11/2011 | Bauer | H02J 7/0042 307/77 |
| 2012/0048588 A1 | 3/2012 | Iyoda et al. | |
| 2012/0113571 A1 * | 5/2012 | Merhar, III | B25F 5/00 361/679.01 |
| 2013/0025893 A1 * | 1/2013 | Ota | H02J 1/10 320/112 |
| 2013/0068492 A1 * | 3/2013 | Nakayama | B25F 5/00 173/217 |
| 2013/0154584 A1 * | 6/2013 | Sakaue | G05F 1/46 323/234 |
| 2013/0334898 A1 * | 12/2013 | Kao | H02M 7/02 307/151 |
| 2014/0370743 A1 * | 12/2014 | Maesnor | H02J 7/0042 439/504 |
| 2015/0042280 A1 * | 2/2015 | Rief | H02J 7/0044 320/113 |
| 2015/0050532 A1 * | 2/2015 | Waigel | H01M 10/6561 429/61 |
| 2016/0144530 A1 * | 5/2016 | Weinig | B23D 57/023 439/180 |
| 2017/0069884 A1 * | 3/2017 | Beddow | B25F 5/00 |
| 2017/0358909 A1 * | 12/2017 | Ballard | B25F 5/02 |
| 2018/0021603 A1 * | 1/2018 | Horne | A62B 3/005 254/93 R |
| 2018/0147713 A1 * | 5/2018 | Schmauder | B25F 5/02 |
| 2018/0233936 A1 * | 8/2018 | Yamada | H02J 7/00 |
| 2018/0311807 A1 * | 11/2018 | Sergyeyenko | H02J 7/0048 |
| 2019/0091848 A1 * | 3/2019 | Walker | B25F 5/00 |
| 2019/0259985 A1 * | 8/2019 | Hanawa | H02J 7/0045 |
| 2019/0326716 A1 * | 10/2019 | Nowalis | H01R 31/065 |
| 2020/0295659 A1 * | 9/2020 | Yoshinari | H02M 1/007 |
| 2021/0210793 A1 * | 7/2021 | Yamaguchi | H01M 50/583 |
| 2022/0123571 A1 * | 4/2022 | Spencer | B25F 5/00 |
| 2022/0126122 A1 * | 4/2022 | McCarthy | B25F 5/02 |
| 2022/0173559 A1 * | 6/2022 | Naimo | B25F 5/00 |
| 2022/0190617 A1 * | 6/2022 | Roberts | H02J 7/02 |
| 2022/0200300 A1 * | 6/2022 | Krondorfer | H02J 7/0044 |
| 2022/0216799 A1 * | 7/2022 | Yoshinari | H02M 3/33546 |
| 2022/0266437 A1 * | 8/2022 | Silorio | A01B 1/227 |
| 2022/0389727 A1 * | 12/2022 | Ebisawa | B25F 5/02 |
| 2023/0249331 A1 * | 8/2023 | Fiferna | B25F 5/008 173/217 |

FOREIGN PATENT DOCUMENTS

| | | | |
|---|---|---|---|
| CN | 102947056 A | 2/2013 | |
| CN | 103260804 A | 8/2013 | |
| CN | 106181901 A | 12/2016 | |
| CN | 207104838 U | 3/2018 | |
| DE | 2545838 A1 | 4/1977 | |
| DE | 19505983 A1 | 8/1996 | |
| DE | 102007013644 A1 | 9/2008 | |
| EP | 2424001 A2 * | 2/2012 | B25F 5/00 |
| EP | 2559521 A1 | 2/2013 | |
| EP | 2712713 A1 * | 4/2014 | B25F 5/02 |
| EP | 2422611 B1 | 10/2016 | |
| GB | 2417182 A | 2/2006 | |
| GB | 2460696 A | 12/2009 | |
| JP | 2011173219 A | 9/2011 | |
| JP | 2012048885 A | 3/2012 | |
| JP | 2014128856 A | 7/2014 | |
| JP | 2015100328 A | 6/2015 | |
| JP | 2015193079 A | 11/2015 | |
| JP | 2017202537 A | 11/2017 | |
| WO | 2014119174 A1 | 8/2014 | |

OTHER PUBLICATIONS

Swedish Search Report in Swedish patent application No. 1951121-1, dated Apr. 27, 2020.

* cited by examiner

BATTERY ADAPTER ASSEMBLY AND HAND-HELD POWER TOOL

TECHNICAL FIELD

The present disclosure relates to a battery adapter assembly for an electrically driven hand-held power tool. The present disclosure further relates to a hand-held power tool.

BACKGROUND

Today, there are many kinds of power tools available on the market. A common feature of power tools is that they comprise a tool which can be driven by a power source other than solely manual labour. The power source may comprise an electric motor or a combustion engine.

There are several concerns that may be addressed when designing a power tool. A main concern is safety. That is, when designing a power tool, one must ensure that a user can operate the power tool in a safe manner. Another concern that may be addressed is ergonomics. A power tool is usually and preferably designed to allow operation in different operational directions and angles, which puts requirements on the design of the power tool. A further concern that may be addressed is user-friendliness. For example, it is an advantage if the power tool is designed such that a user can operate the power tool in a simple and non-distractive manner.

The above-mentioned concerns are at least partially linked. That is, an ergonomic and user-friendly power tool usually is safer than a less ergonomic and user-friendly power tool, partly since the risk of incorrect use of such a power tool is reduced.

Electrically driven power tools have some advantages over power tools driven by a combustion engine, especially regarding emissions and noise generated by the power tool. However, they are also associated with some drawbacks. One drawback is the supply of electricity to the electric motor. Many power tools operate at high power levels which requires a lot of electrical energy.

Some power tools are provided with a battery connection interface for connection of a battery to the power tool. Such power tools are normally simple to use. However, the battery adds weight to the power tool which may put extra strain on arms, hands, and back of a user during operation of the power tool. Moreover, a battery can store a limited amount of electrical energy which puts limitations on the available operational time of the power tool.

Batteries adapted to be carried on the body of a user, such as a backpack batteries and belt-mounted batteries, have been developed in recent years. Such batteries have the advantage of moving the weight from the power tool to the body of the user. In this manner, the user may experience less strain on arms, hands, and back during operation of the power tool. Moreover, larger sized batteries can be used which increases the available operational time of the power tool.

A battery adapter assembly can be used to provide an electrical connection between such a battery and a battery connection interface of the power tool. Normally, a battery adapter assembly comprises a battery adapter and a power cord, wherein the battery adapter is configured to be connected to the battery connection interface of the power tool. The power cord normally comprises a first end connected to the battery adapter and a second end for connection to the battery. For smaller tasks, a user may connect a battery directly to the battery connection interface and operate the power tool. For larger tasks requiring more time and more electrical energy, the user may connect the battery adapter to the battery connection interface and use a battery carried on the body of the user for operating the power tool. In this manner, the user may operate the power tool with less strain on arms, hands, and back.

As indicated above, these types of power tools and these types of battery adapter assemblies provide many advantages. However, they are still associated with some concerns and drawbacks regarding ergonomics and user-friendliness.

SUMMARY

It is an object of the present invention to overcome, or at least alleviate, at least some of the above-mentioned concerns and drawbacks.

According to a first aspect of the invention, the object is achieved by a battery adapter assembly for an electrically driven hand-held power tool. The battery adapter assembly comprises a battery adapter configured to be connected to a battery connection interface of the power tool, and a power cord comprising a first end connected to the battery adapter and a second end for connection to a power supply. The power cord comprises at least a first fixation element configured to fixate the power cord to a cord holding arrangement of the power tool.

Since the power cord comprises the at least first fixation element, a battery adapter assembly is provided capable of facilitating use of an electrically driven hand-held power tool. This because the at least first fixation element can fixate the power cord to the cord holding arrangement of the power tool to thereby reduce the disturbance caused by the power cord.

Moreover, as a further result, a battery adapter assembly is provided capable of providing a more ergonomic use of an electrically driven hand-held power tool.

In addition, since the battery adapter assembly is capable of facilitating use and providing a more ergonomic use of an electrically driven hand-held power tool, a battery adapter assembly is provided capable of improving safety during operation of an electrically driven power tool.

Accordingly, a battery adapter assembly is provided overcoming, or at least alleviating, at least some of the above-mentioned concerns and drawbacks. As a result, the above-mentioned object is achieved.

Optionally, the cord holding arrangement comprises a groove. Thereby, at least a portion of the power cord can be protected from becoming damaged during use of the power tool. Moreover, the power cord can be held in a more secure manner in the cord holding arrangement. Thereby, the safety during operation of the power tool may be further improved.

Optionally, the first fixation element is frustoconical. Thereby, the power cord can be fixated to the cord holding arrangement in a further secure manner.

Optionally, the power cord comprises a second fixation element arranged at a distance from the first fixation element along the power cord so as to form a power cord section between the first and second fixation elements, and wherein the power cord section is configured to be held by the cord holding arrangement of the power tool. Thereby, the power cord can be fixated to the cord holding arrangement in a further secure manner which further reduces the risk of the power cord becoming loose during operation of the power tool.

Optionally, the second fixation element is frustoconical. Thereby, the power cord can be fixated to the cord holding arrangement in a further secure manner.

Optionally, the power cord section is configured to be inserted into the groove. Thereby, the power cord section is protected from becoming damaged during use of the power tool. Thereby, the safety during operation of the power tool may be further improved.

Optionally, the first fixation element is arranged to abut against a first end portion of the cord holding arrangement and the second fixation element is arranged to abut against a second end portion of the cord holding arrangement. Thereby, the power cord can be fixated to the cord holding arrangement in a further secure manner which further reduces the risk of the power cord becoming loose during operation of the power tool.

Optionally, the second fixation element is slidably attached to the power cord and is biased along the power cord in a direction towards the first fixation element. Thereby, the power cord can be fixated to the cord holding arrangement in a further secure manner which further reduces the risk of the power cord becoming loose during operation of the power tool. This because the biasing force of the second fixation element along the power cord may fixate the first and second fixation elements in a further secure manner to the first and second end portions of the cord holding arrangement. Moreover, a battery adapter assembly is provided in which the power cord can be attached to, and removed from, the cord holding arrangement in a simpler and more user-friendly manner.

Optionally, the power cord comprises a spring element configured to bias the second fixation element along the power cord in a direction towards the first fixation element. Thereby, a simple, reliable, and efficient biasing of the second fixation element is provided along the power cord. Moreover, the battery adapter assembly provides conditions for attaching and removing the power cord to and from the cord holding arrangement in a still simpler and more user-friendly manner.

Optionally, the power cord comprises a stopper rigidly attached to the power cord, and wherein the spring element is arranged to apply the biasing force between the stopper and the second fixation element. Thereby, a simple, reliable, and efficient biasing of the second fixation element is provided along the power cord. Moreover, a battery adapter assembly is provided in which the power cord can be attached to, and removed from, the cord holding arrangement in a simpler and more user-friendly manner.

Optionally, the spring element is a coil spring. Thereby, a simple, reliable, and efficient biasing of the second fixation element is provided along the power cord. Moreover, the coil spring may stabilize the power cord and may act as a grommet protecting the power cord from being bent over a maximum degree of bending where the power cord becomes damaged. Thereby, the safety during operation of the power tool can be further improved. In addition, due to these features, a battery adapter assembly is provided capable of further facilitating use of a power tool and providing conditions for a more ergonomic use of the power tool. Moreover, the battery adapter assembly provides conditions for attaching and removing the power cord to and from the cord holding arrangement in a still simpler and more user-friendly manner.

Optionally, the spring element has a smaller pitch in a region of the second fixation element than in a region of the stopper. Thereby, the spring element provides a greater resistance to bending at the region of the second fixation element which further protects the power cord from being bent over the maximum degree of bending. Moreover, a lower resistance to bending is provided at the region of the stopper, which may further improve ergonomics and user-friendliness of the power tool.

Optionally, the battery adapter comprises a mechanical key arrangement configured to allow connection of the battery adapter only to certain types of battery connection interfaces of power tools. Thereby, a battery adapter assembly is provided significantly reducing the risk of incorrect use of the battery adapter assembly. As a result, the safety during use of the battery adapter assembly may be further improved.

Optionally, the mechanical key arrangement is configured to allow connection of the battery adapter only to battery connection interfaces of power tools having an electric power consumption below a predetermined electric power consumption. Thereby, due to these features, a user is blocked from connecting the battery adapter to battery connection interfaces of power tools having an electric power consumption above the predetermined electric power consumption. Thereby, components of the battery adapter assembly, such as the power cord, is protected from becoming damaged by excessive electricity. In addition, due to these features, a battery adapter assembly is provided significantly reducing the risk of incorrect use of the battery adapter assembly which may further improve the safety during use of the battery adapter assembly.

Optionally, a second end of the power cord comprises a connector for connecting the power cord to a battery. Thereby, a user-friendly battery adapter assembly is provided which provides conditions for a user to select a battery and connect the battery to the battery connection interface of the power tool using the battery adapter assembly.

Optionally, the battery is a battery adapted to be carried on the body of a user, such as a backpack battery or a belt-mounted battery. In this manner, the user can perform operation with the power tool with a low amount of strain on arms, hands, and back, and conditions are provided for an extended operational time of the power tool.

According to a second aspect of the invention, the object is achieved by a hand-held power tool comprising a tool, an electric motor configured to power the tool, and a battery connection interface configured to receive a battery adapter of a battery adapter assembly for transmitting electricity to the electric motor via the battery adapter assembly. The power tool comprises a cord holding arrangement configured to hold a power cord section of a power cord of the battery adapter assembly.

Since the power tool comprises the cord holding arrangement, a power tool is provided which can be used in a simple and ergonomic manner. This because the cord holding arrangement can hold the power cord section of the power cord of the battery adapter assembly to thereby reduce the disturbance caused by the power cord.

In addition, since the power tool can be used in a simple and ergonomic manner, a power tool is provided having conditions for an improved safety during operation thereof.

Accordingly, a power tool is provided overcoming, or at least alleviating, at least some of the above-mentioned concerns and drawbacks. As a result, the above-mentioned object is achieved.

Optionally, the cord holding arrangement comprises a groove. Thereby, the power cord section of the battery adapter assembly is protected from becoming damaged during use of the power tool. Thereby, the safety during operation of the power tool can be further improved.

Optionally, the cord holding arrangement comprises a first and a second end portion, and wherein at least one of the first and second end portions is configured to receive a fixation element of the power cord. Thereby, the power cord can be fixated to the cord holding arrangement in a further secure manner which may reduce the risk of the power cord becoming loose during operation of the power tool.

Optionally, at least one of the first and second end portions is funnel-shaped. Thereby, the power cord can be fixated to the cord holding arrangement in a further secure manner which may reduce the risk of the power cord becoming loose during operation of the power tool.

Optionally, the second end portion of the cord holding arrangement is arranged at a rear portion of the power tool facing away from the tool. Thereby, a power tool is provided which can be used in a still simpler and more ergonomic manner. Furthermore, a still safer power tool may be provided. This because the power cord of the battery adapter assembly will be securely retained at the rear portion of the power tool and will extend from the power tool at a position being remote from the tool of the power tool.

Optionally, the power tool comprises a first handle unit comprising a first grip portion, and wherein the cord holding arrangement is arranged on the first handle unit. Thereby, a power tool is provided which can be used in a still simpler and more ergonomic manner. Furthermore, a still safer power tool may be provided. This because the power cord of the battery adapter assembly will be securely retained at the first handle unit of the power tool and will extend from the power tool at a position being remote from the tool of the power tool.

Optionally, the first handle unit comprises a shield section arranged at a distance from the first grip portion, and wherein the cord holding arrangement is arranged on the shield section. Thereby, a power tool is provided which can be used in a still simpler and more ergonomic manner. Furthermore, a still safer power tool may be provided. This because the power cord of the battery adapter assembly will be securely retained at the shield section of the first handle unit and will extend from the power tool at a position being remote from the tool of the power tool.

Optionally, the cord holding arrangement is arranged on a side of the shield section facing away from the first grip portion. Thereby, a power tool is provided which can be used in a still simpler and more ergonomic manner. This because the power cord of the battery adapter assembly will be located at a position of the first handle unit where it has a low probability of disturbing a user of the power tool.

Optionally, the first grip portion comprises a throttle actuator arranged on a side of the first grip portion facing the shield section. Thereby, the throttle actuator can be actuated without being disturbed by the power cord. Thereby, the safety during operation of the power tool can be further improved.

Optionally, the first handle unit is a rear handle unit arranged at a rear portion of the power tool facing away from the tool. Thereby, a power tool is provided which can be used in a still simpler and more ergonomic manner. Furthermore, a still safer power tool may be provided. This because the power cord of the battery adapter assembly may be securely retained at the first handle unit and may extend from the power tool at a position being remote from the tool of the power tool.

Optionally, the power tool comprises a main body comprising the electric motor, and wherein the first handle unit is pivotally attached to the main body. Thereby, a power tool is provided which can be used in a still simpler and more ergonomic manner. As a further result thereof, a still safer power tool is provided. This because the first handle unit, to which the power cord of the battery adapter assembly may be securely retained, can be pivoted relative to the main body so as to allow for different operational directions and angles of the tool of the power tool without assuming burdensome working positions.

Optionally, the first handle unit is pivotally attached to the main body between a first and a second end position, and wherein the angle between the first and second end positions is at least 90 degrees, or at least 170 degrees. Thereby, a power tool is provided which can be used in a still simpler and more ergonomic manner. As a further result thereof, a still safer power tool may be provided. This because the first handle unit, to which the power cord of the battery adapter assembly may be securely retained, can be pivoted relative to the main body at least 90 degrees, or at least 170 degrees, so as to allow for different operational positions of the tool of the power tool without assuming burdensome working positions.

Optionally, the power tool comprises a second handle unit arranged at a position of the power tool between the first handle unit and the tool. Thereby, a power tool is provided which can be used in a still simpler and more ergonomic manner Optionally, the power tool comprises a battery adapter assembly according to some embodiments of the present disclosure. Thereby, a power tool is provided which can be used in simple, ergonomic, and user-friendly manner.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout.

Well-known functions or constructions will not necessarily be described in detail for brevity and/or clarity.

Figure 1:
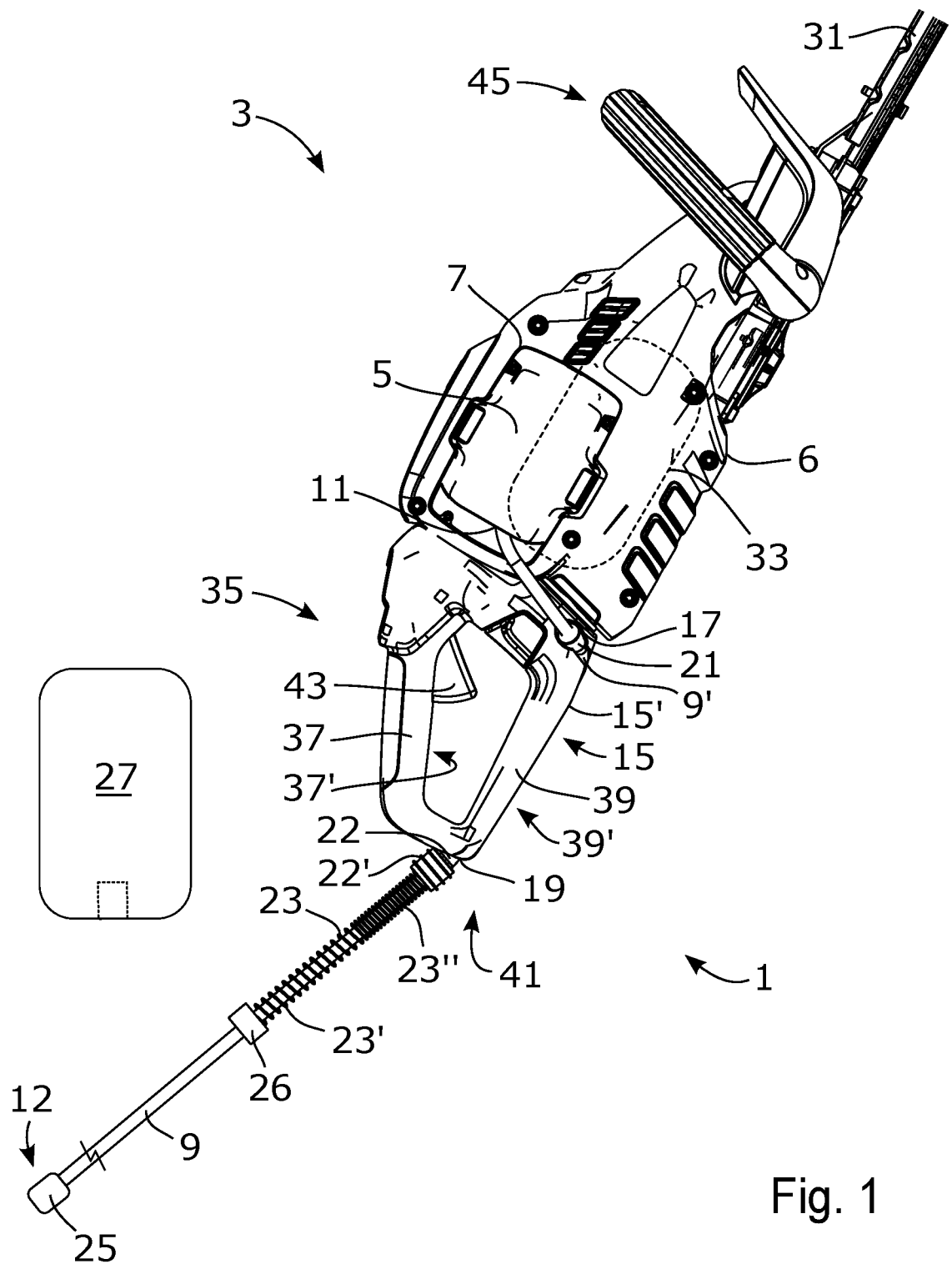
FIG. 1 illustrates an electrically driven hand-held power tool according to some embodiments of the present disclosure.

FIG. 1 illustrates an electrically driven hand-held power tool 3 according to some embodiments of the present disclosure. For the reason of brevity and clarity, the electrically driven hand-held power tool 3 is in some places herein referred to as "the hand-held power tool 3", or simply "the power tool 3". According to the illustrated embodiments, the power tool 3 is a hedge trimmer. It is to be understood that the illustrated hedge trimmer constitutes example embodiments of the invention, which invention is defined only by the appended claims. Thus, according to embodiments herein, the power tool 3 may be another type of power tool than a hedge trimmer, which is further explained herein.

The power tool 3 comprises a tool 31, which according to the illustrated example embodiments is a cutting tool for cutting vegetation. Moreover, the power tool 3 comprises a main body 6 comprising an electric motor 33. The electric motor 33 is configured to power the tool 31. Furthermore, the power tool 3 comprises a battery connection interface 7.

FIG. 1 also illustrates a battery adapter assembly 1 according to some embodiments of the present disclosure. The battery adapter assembly 1 comprises a battery adapter 5 and a power cord 9. The power cord 9 comprises a first end 11 connected to the battery adapter 5 and a second end 12 for connection to a power supply 27, such as a battery 27. According to the illustrated embodiments, the second end 12 of the power cord 9 comprises a connector 25 for connecting the power cord 9 to the battery 27. The battery 27 may be a battery 27 adapted to be carried on the body of a user, such as a backpack battery or a belt-mounted battery, as is further explained herein.

In FIG. 1, the battery adapter 5 is connected to the battery connection interface 7 of the power tool 3. The battery connection interface 7 comprises electrical contacts connected to the electric motor 33 of the power tool 3, via a control arrangement of the power tool 3. The battery adapter 5 comprises electrical contacts configured to abut against the electrical contacts of the battery connection interface 7 when the battery adapter 5 is connected to the battery connection interface 7. In this manner, electrical energy can be transferred from a power supply 27, such as a battery 27, to the electric motor 33, via the battery adapter assembly 1. The electrical contacts and the control arrangement referred to above are not illustrated in FIG. 1 for the reason of brevity and clarity.

As indicated in FIG. 1, the power tool 3 comprises a cord holding arrangement 15. The cord holding arrangement 15 is configured to hold a power cord section 9' of the power cord 9 of the battery adapter assembly 1, as is further explained herein. According to the illustrated embodiments, the cord holding arrangement 15 comprises a groove 15' and the power cord section 9' is configured to be inserted into the groove 15'.

The power tool 3 comprises a first handle unit 35 comprising a first grip portion 37. According to the illustrated embodiments, and as is further explained herein, the first handle unit 35 is pivotally attached relative to the main body 6. The first grip portion 37 comprises a throttle actuator 43 for controlling the power of the electric motor 33. The first handle unit 35 is a rear handle unit arranged at a rear portion 41 of the power tool 3 facing away from the tool 31 of the power tool 3. The power tool 3 further comprises a second handle unit 45 arranged at a position of the power tool 3 between the first handle unit 35 and the tool 31. According to the illustrated embodiments, the cord holding arrangement 15 is arranged on the first handle unit 35. Moreover, the first handle unit 35 comprises a shield section 39 arranged at a distance from the first grip portion 37, and wherein the cord holding arrangement 15 is arranged on the shield section 39 of the first handle unit 35. The throttle actuator 43 is arranged on a side 37' of the first grip portion 37 facing the shield section 39. In addition, the cord holding arrangement 15 is arranged on a side 39' of the shield section 39 facing away from the first grip portion 37. Due to these features, the power cord 9 of the battery adapter assembly 1 will not disturb a user of the power tool 3 during use of the power tool 3 and the power cord 9 will extend from the power tool 3 at a position being remote from the tool 31 of the power tool 3.

Figure 2:
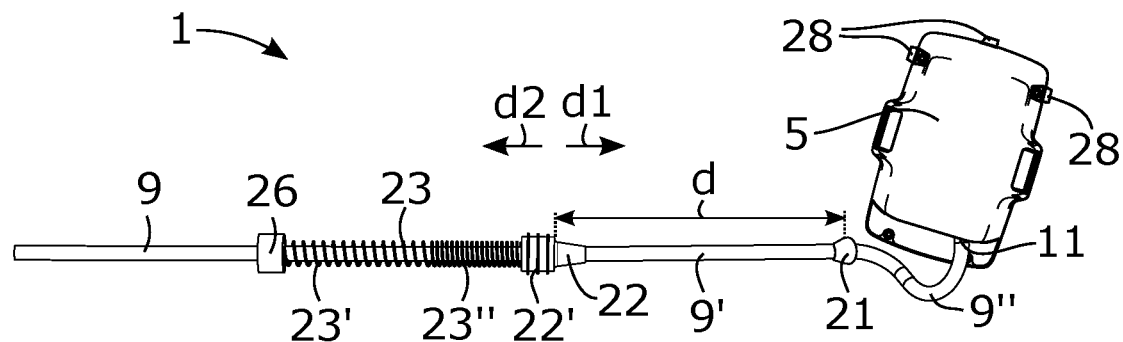
FIG. 2 illustrates a battery adapter assembly according to some embodiments of the present disclosure.

FIG. 2 illustrates a battery adapter assembly 1, according to the embodiments illustrated in FIG. 1. Below, simultaneous reference is made to FIG. 1 and FIG. 2, if not indicated otherwise. The power cord 9 comprises a first fixation element 21 configured to fixate the power cord 9 to the cord holding arrangement 15 of the power tool 3. Moreover, according to the illustrated embodiments, the power cord 9 comprises a second fixation element 22 configured to fixate the power cord 9 to the cord holding arrangement 15 of the power tool 3. The second fixation element 22 is arranged at a distance d from the first fixation element 21 along the power cord 9 so as to form the power cord section 9' between the first and second fixation elements 21, 22.

According to the illustrated embodiments, each of the first and second fixation elements 21, 22 is frustoconical with the narrow part of the frustoconical fixation element 21, 22 arranged adjacent to the power cord section 9' between the first and second fixation elements 21, 22. According to further embodiments, at least one of the first and second fixation elements 21, 22 may be frustoconical with the narrow part of the frustoconical fixation element 21, 22 arranged adjacent to the power cord section 9'. According to the illustrated embodiments, the first fixation element 21 is arranged closer to the first end 11 of the power cord 9, i.e. closer to the battery adapter 5, than the second fixation element 22 along the power cord 9.

Figure 3:
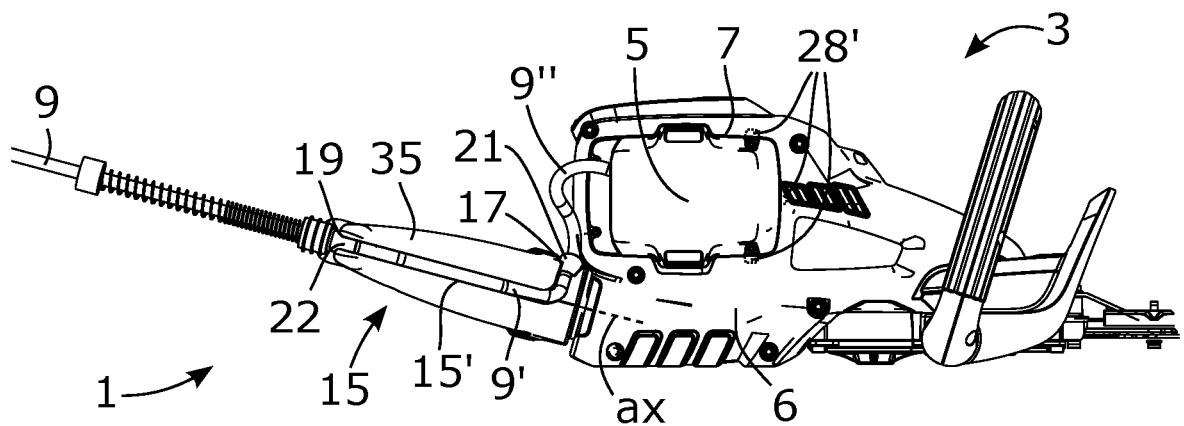
FIG. 3 illustrates the power tool according to the embodiments illustrated in FIG. 1, with a first handle unit pivoted relative to a main body of the power tool to a first end position.

FIG. 3 illustrates the power tool 3 according to the embodiments illustrated in FIG. 1, with the first handle unit 35 pivoted relative to the main body 6 of the power tool 3 to a first end position. In FIG. 3, the first handle unit 35 has been pivoted approximately 90 degrees counterclockwise relative to the position of the first handle unit 35 illustrated in FIG. 1 when seen in a direction towards the rear portion 41 of the power tool 3.

Figure 4:
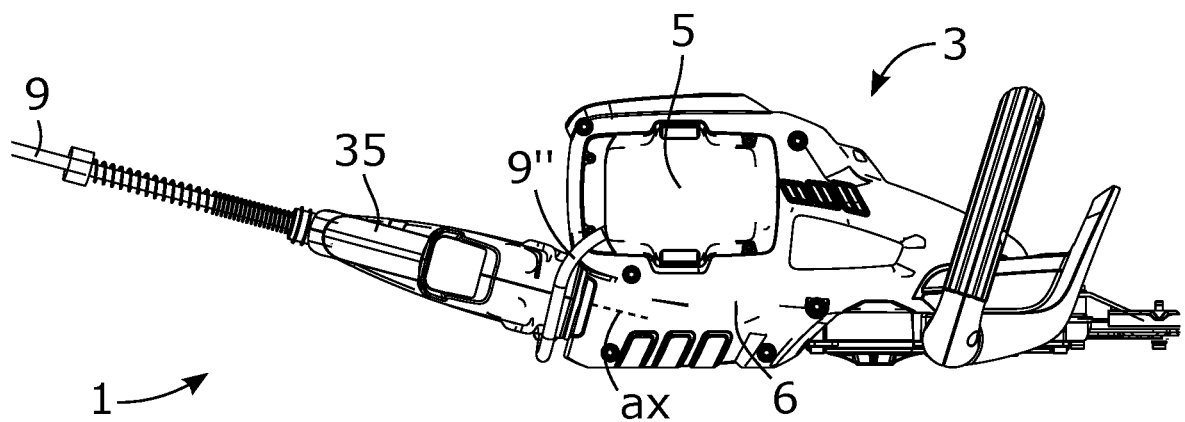
FIG. 4 illustrates the power tool according to the embodiments illustrated in FIG. 1 and FIG. 3, with the first handle unit pivoted relative to the main body of the power tool to a second end position.

FIG. 4 illustrates the power tool 3 according to the embodiments illustrated in FIG. 1 and FIG. 3, with the first handle unit 35 pivoted relative to the main body 6 of the power tool 3 to a second end position. In FIG. 4, the first handle unit 35 has been pivoted approximately 90 degrees clockwise relative to the position of the first handle unit 35 illustrated in FIG. 1, i.e. approximately 180 degrees clockwise relative to the position of the first handle unit 35 illustrated in FIG. 3 when seen in a direction towards the rear portion of the power tool 3.

Thus, the first handle unit 35 is pivotally attached to the main body 6 around a pivot axis ax between the first and the second end position, and according to the illustrated embodiments, the angle between the first and second end positions is approximately 180 degrees. According to further embodiments, the angle between the first and second end positions may be at least 90 degrees, or at least 170 degrees.

As indicated in FIG. 2-FIG. 4, the power cord 9 comprises a second power cord section 9" between the first fixation element 21 and the battery adapter 5. The length of the second power cord section 9" allows the first handle unit 35 to be pivoted between the first and second end positions.

As is best seen in FIG. 3, the first fixation element 21 is arranged to abut against a first end portion 17 of the cord holding arrangement 15. Moreover, the second fixation element 22 is arranged to abut against a second end portion 19 of the cord holding arrangement 15. In this manner, the power cord 9 is securely fixated to the cord holding arrangement 15, as is further explained herein. Thus, according to the illustrated embodiments, the cord holding arrangement 15 comprises a first and a second end portion 17, 19, and wherein at least one of the first and second end portions 17, 19 is configured to receive a fixation element 21, 22 of the power cord 9. Moreover, according to the illustrated embodiments, each of the first and second end portions 17, 19 is funnel-shaped. In this manner, the power cord 9 is further securely fixated to the cord holding arrangement 15. According to further embodiments, at least one of the first and second end portions 17, 19 may be funnel-shaped.

The following will be explained with reference to FIG. 2. According to the illustrated embodiments, the second fixation element 22 is slidably attached to the power cord 9. Moreover, the second fixation element 22 is biased along the power cord 9 in a direction d1 towards the first fixation element 21. According to the illustrated embodiments, the power cord 9 comprises a spring element 23 configured to bias the second fixation element 22 along the power cord 9 in the direction d1 towards the first fixation element 21. The power cord 9 comprises a stopper 26 rigidly attached to the power cord 9. The spring element 23 is arranged to apply a repellent biasing force between the stopper 26 and the second fixation element 22. In this manner, the process of attaching the power cord section 9' to the cord holding arrangement is significantly facilitated as well as the process of removing the cord section 9' from the cord holding arrangement, as is further explained herein. In addition, the biasing force of the spring element 23 ensures a contracting force between the first and second fixation elements 21, 22 which further ensures fixation of the power cord section 9' to the cord holding arrangement 15. According to the illustrated embodiments, the first fixation element 21 is rigidly attached to the power cord 9. As understood from the above, the distance d between the first and second fixation elements 21, 22, indicated in FIG. 2, corresponds to a length of the cord holding arrangement 15 when the power cord section 9' is arranged in the cord holding arrangement 15.

According to the illustrated embodiments, the spring element 23 is a coil spring. As indicated in FIG. 1, the second end portion 19 of the cord holding arrangement 15 is arranged at a rear portion 41 of the power tool 3 facing away from the tool 31. As indicated in FIG. 1 and FIG. 2, the spring element 23 has a smaller pitch in a region 23" of the second fixation element 22 than in a region 23' of the stopper 26. Accordingly, the distance between segments of the spring element 23 is smaller in the region 23" of the second fixation element 22 than in the region 23' of the stopper 26. Thereby, the spring element 23 provides a greater resistance to bending at the region 23" of the second fixation element 22 which further protects the power cord from being bent over the maximum degree of bending. Moreover, a lower resistance to bending is provided at the region 23' of the stopper 26, which may further improve ergonomics and user-friendliness of the power tool 3.

As can be seen in FIG. 2, according to the illustrated embodiments, the battery adapter 5 comprises a mechanical key arrangement 28. The mechanical key arrangement 28 is configured to allow connection of the battery adapter 5 only to certain types of battery connection interfaces 7 of power tools 3. The mechanical key arrangement 28 may be configured to allow connection of the battery adapter 5 only to battery connection interfaces 7 of power tools 3 having an electric power consumption below a predetermined electric power consumption. According to the illustrated embodiments, the mechanical key arrangement 28 comprises a set of protrusions 28.

As indicated in FIG. 3, the battery connection interface 7 of the power tool 3 comprises a mechanical key arrangement 28' comprising a corresponding set of recesses 28'. The protrusions 28 of the mechanical key arrangement 28 of the battery adapter 5 is configured to fit into the recesses 28' of the mechanical key arrangement 28' of the battery connection interface 7 of the power tool 3. Battery connection interfaces of power tools having an electric power consumption above the predetermined electric power consumption may lack one or more of the recesses 28'. In this manner, the battery adapter 5 according to the embodiments illustrated in FIG. 2 cannot be connected to such a battery connection interface. Thereby, components of the battery adapter assembly 1, such as the power cord 9, is protected from becoming damaged by excessive electricity.

According to some embodiments, the predetermined electric power consumption may be 1000 W or 800 W. In this manner, according to these embodiments, the battery adapter assembly 1 can comprise a thin power cord 9, such as a power cord 9 with a cable area less than 2.5 mm$^2$, which provides conditions for a flexible power cord 9 facilitating use of the power tool 3.

Figure 5:
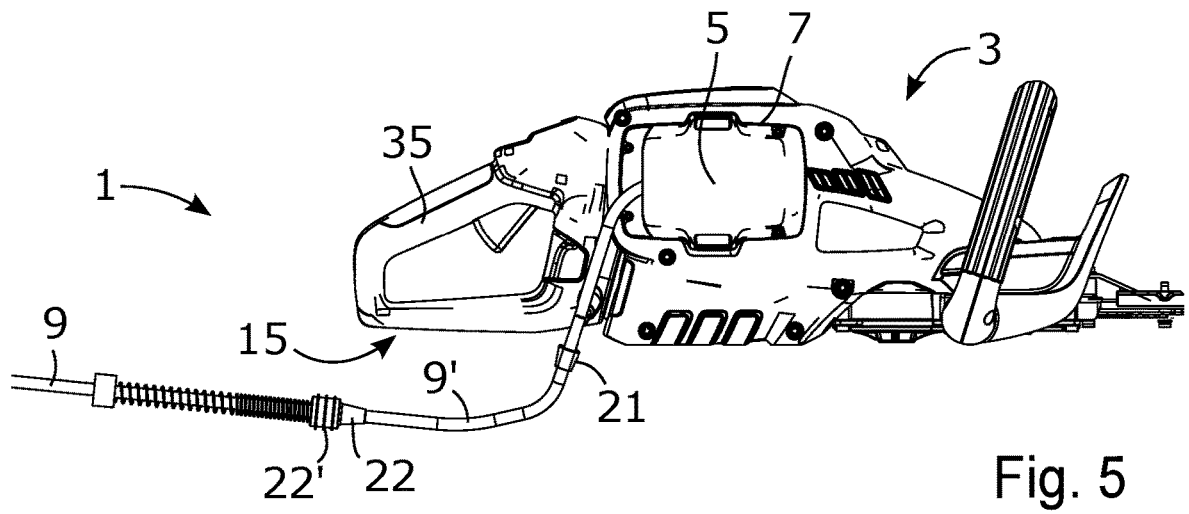
FIG. 5 illustrates the power tool according to the embodiments illustrated in FIG. 1, FIG. 3, and FIG. 4 with a power cord section removed from a cord holding arrangement of the power tool.

FIG. 5 illustrates the power tool 3 according to the embodiments illustrated in FIG. 1, FIG. 3, and FIG. 4, with the power cord section 9' removed from the cord holding arrangement 15 of the power tool 3. As indicated in FIG. 1, FIG. 2, and FIG. 5, the second fixation element 22 comprises a grip surface 22' provided with a set of ridges configured to increase friction between fingers of a user and the second fixation element 22. The grip surface 22' facilitates displacement of the second fixation element 22 along the power cord 9 in a direction d2 away from the first fixation element 21. The direction d2 along the power cord 9 away from the first fixation element 21 is indicated in FIG. 2.

The following is explained with reference to FIG. 1. A user of the power tool 3 may grip the grip surface 22' of the second fixation element 22 and pull the second fixation element 22 in a direction away from second end portion 19 of the cord holding arrangement 15 located at the rear portion 41 of the power tool 3. As a result thereof, the spring element 23 is compressed and the distance d between the first and second fixation elements 21, 22, indicated in FIG. 2, is increased. In this manner, the second fixation element 22 and the power cord section 9' can be removed from the cord holding arrangement 15 in a quick and simple manner. When removed, the power cord 9 will assume a position as illustrated in FIG. 5.

Figure 6:
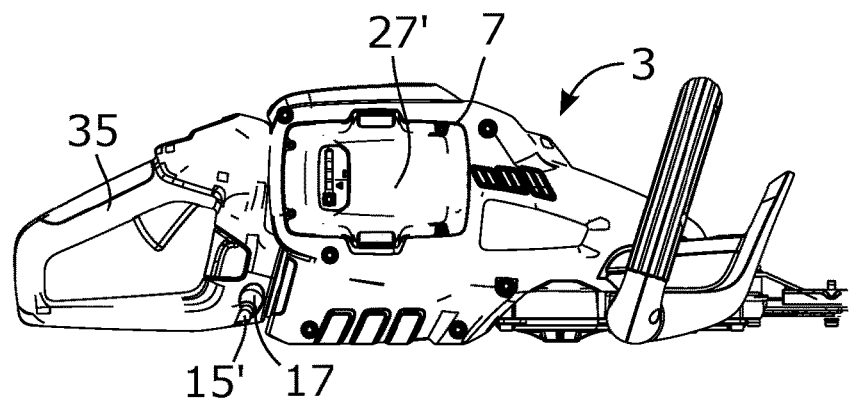
FIG. 6 illustrates the power tool according to the embodiments illustrated in FIG. 1 and FIG. 3-FIG. 5 with a battery adapter removed from a battery connection interface of the power tool and a battery being connected to the battery connection interface.

FIG. 6 illustrates the power tool 3 according to the embodiments illustrated in FIG. 1 and FIG. 3-FIG. 5 with the battery adapter of the battery adapter assembly removed and a battery 27' being connected to the battery connection interface 7 of the power tool 3. A user may thus replace the battery adapter assembly 1 with a battery 27' for example when wanting to perform smaller tasks that is not as time and/or energy consuming. Since the battery 27' comprises a number of battery cells, the battery 27' adds weight to the power tool 3 when connected to the battery connection interface 7 of the power tool 3. The added weight puts more strain on arms, hands, and back of a user during operation of the power tool 3.

If the user wants to perform larger tasks requiring more time and/or electrical energy, the user may remove the battery 27' from the battery connection interface 7 and connect the battery adapter 5 of the battery adapter assembly 1 to the battery connection interface 7 of the power tool 3, as illustrated in FIG. 5. Then, the user may position the first fixation element 21 into the first end portion 17 of the cord holding arrangement 15 and insert at least a portion of the power cord section 9' into the cord holding arrangement 15. Then, the user may grip the grip surface 22' of the second fixation element 22 and pull the second fixation element 22 in a direction d2 away from first fixation element 21, indicated in FIG. 2. As a result thereof, the spring element 23 is compressed and the distance d between the first and second fixation elements 21, 22 is increased. In this manner, the power cord section 9' can be fully inserted into the cord holding arrangement 15 and the second fixation element 22 can be positioned at the second end portion 19 in a quick and simple manner. The user may then release the pulling force from the second fixation element 22. As a result thereof, the second fixation element 22 is displaced towards the second end portion 19 of the cord holding arrangement 15 by the biasing force of the spring element 23 and the power cord section 9' is securely retained in the cord holding arrangement 15. Accordingly, in this manner, the power cord section 9' can be attached to the cord holding arrangement 15 in a quick, reliable and simple manner.

Figure 7:
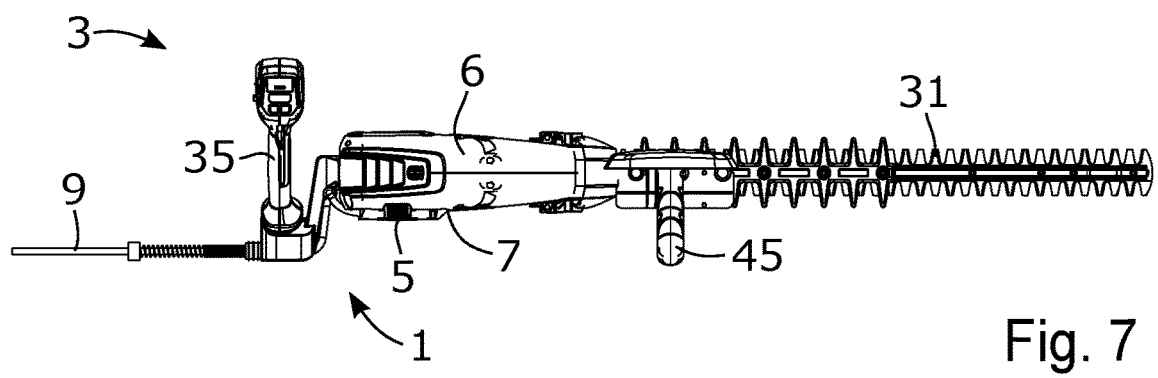
FIG. 7 illustrates a top view of a power tool according to some further embodiments of the present disclosure.

FIG. 7 illustrates a top view of a power tool 3 according to some further embodiments of the present disclosure. The power tool 3 according to the embodiments illustrated in FIG. 7 comprises the same features, functions, and advantages as the power tool 3 according to the embodiments illustrated in FIG. 1 and FIG. 3-FIG. 6 with some exceptions explained below.

According to the embodiments illustrated in FIG. 7, the power tool 3 comprises a single sided rear handle unit 35. The single sided rear handle unit 35 may be pivotally attached to a main body 6 of the power tool 3. Moreover, the power tool 3 according to the embodiments illustrated in FIG. 7 comprises a single sided front handle unit 45 arranged at a position of the power tool 3 between the rear handle unit 35 and a tool 31 of the power tool 3. The power tool 3 illustrated in FIG. 7 comprises a battery adapter assembly 1 attached to the power tool 3.

Figure 8:
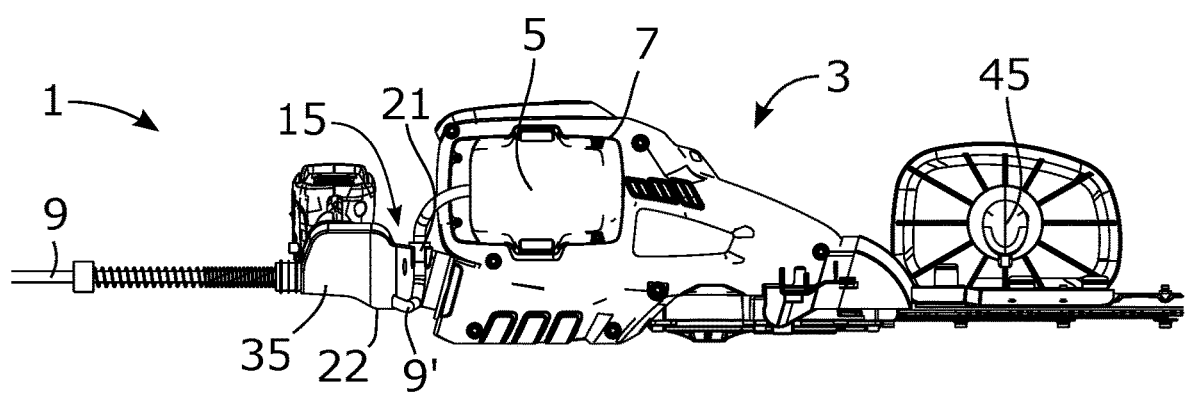
FIG. 8 illustrates a side view of the power tool illustrated in FIG. 7.

FIG. 8 illustrates a side view of the power tool 3 illustrated in FIG. 7. As best seen in FIG. 8, the battery adapter 5 of the battery adapter assembly 1 is connected to a battery connection interface 7 of the power tool 3. Moreover, the power cord section 9' of the battery adapter assembly 1 is retained in a cord holding arrangement 15 of the power tool 3. The battery adapter assembly 1 according to the embodiments illustrated in FIG. 7 and FIG. 8 may comprise the same features, functions, and advantages as the battery adapter assembly 1 according to the embodiments illustrated in FIG. 1-FIG. 6, with some exceptions explained below. Likewise, the cord holding arrangement 15 of the power tool 3 according to the embodiments illustrated in FIG. 7 and FIG. 8 may comprise the same features, functions, and advantages as the cord holding arrangement 15 of the power tool 3 according to the embodiments illustrated in FIG. 1 and FIG. 3-FIG. 6, with some exceptions explained below.

According to the embodiments illustrated in FIG. 7 and FIG. 8, the power cord section 9' of the battery adapter assembly 1 is provided with a shorter length meaning that the distance between the first and second fixation elements 21, 22 of the power cord 9 is shorter compared to the embodiments illustrated in FIG. 1-FIG. 6. Likewise according to the embodiments illustrated in FIG. 7 and FIG. 8, the length of the cord holding arrangement 15 is shorter than the length of the cord holding arrangement 15 according to the embodiments illustrated in FIG. 1 and FIG. 3-FIG. 6.

According to the illustrated embodiments, the power tool 3 is a hedge trimmer. However, according to further embodiments, the power tool 3, as referred to herein, may be another type of hand-held power tool than a hedge trimmer. Purely as examples, the power tool may be a garden tool, a rotary tool, a reciprocating tool, a multi tool, a leaf blower, a chainsaw, or the like.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. A battery adapter assembly for an electrically driven hand-held power tool, wherein the battery adapter assembly comprises:
    a battery adapter configured to be connected to a battery connection interface of the power tool, and
    a power cord comprising a first end connected to the battery adapter and a second end for connection to a power supply,
    wherein the power cord comprises at least a first fixation element configured to fixate the power cord to a cord holding arrangement of the power tool,
    wherein the power cord comprises a second fixation element arranged at a distance from the first fixation element along the power cord so as to form a power cord section between the first and second fixation elements, and
    wherein the first fixation element is arranged to abut against a first end portion of the cord holding arrangement and the second fixation element is arranged to abut against a second end portion of the cord holding arrangement.

2. The battery adapter assembly according to claim 1, wherein the cord holding arrangement comprises a groove.

3. The battery adapter assembly according to claim 2, wherein the power cord section is configured to be held by the cord holding arrangement of the power tool.

4. The battery adapter assembly according to claim 3, wherein the first fixation element or the second fixation element is frustoconical.

5. The battery adapter assembly according to claim 3, wherein the power cord section is configured to be inserted into the groove.

6. The battery adapter assembly according to claim 1, wherein the battery adapter comprises a mechanical key arrangement configured to allow connection of the battery adapter only to certain types of battery connection interfaces of power tools.

7. The battery adapter assembly according to claim 6, wherein the mechanical key arrangement is configured to allow connection of the battery adapter only to battery connection interfaces of power tools having an electric power consumption below a predetermined electric power consumption.

8. The battery adapter assembly according to claim 1, wherein a second end of the power cord comprises a connector for connecting the power cord to a battery, and wherein the battery is adapted to be carried on a body of a user.

9. A battery adapter assembly for an electrically driven hand-held power tool, wherein the battery adapter assembly comprises:
   a battery adapter configured to be connected to a battery connection interface of the power tool, and
   a power cord comprising a first end connected to the battery adapter and a second end for connection to a power supply,
   wherein the power cord comprises at least a first fixation element configured to fixate the power cord to a cord holding arrangement of the power tool,
   wherein the cord holding arrangement comprises a groove,
   wherein the power cord comprises a second fixation element arranged at a distance from the first fixation element along the power cord so as to form a power cord section between the first and second fixation elements, and wherein the power cord section is configured to be held by the cord holding arrangement of the power tool, and
   wherein the second fixation element is slidably attached to the power cord and is biased along the power cord in a direction towards the first fixation element.

10. The battery adapter assembly according to claim 9, wherein the power cord comprises a spring element configured to bias the second fixation element along the power cord in a direction towards the first fixation element.

11. The battery adapter assembly according to claim 10, wherein the power cord comprises a stopper rigidly attached to the power cord, and wherein the spring element is arranged to apply the biasing force between the stopper and the second fixation element, and wherein the spring element is a coil spring.

12. The battery adapter assembly according to claim 11, wherein the spring element has a smaller pitch in a region of the second fixation element than in a region of the stopper.

13. A hand-held power tool comprising:
   a tool,
   an electric motor configured to power the tool, and
   a battery connection interface configured to receive a battery adapter of a battery adapter assembly for transmitting electricity to the electric motor via the battery adapter assembly,
   and wherein the power tool comprises a cord holding arrangement configured to hold a power cord section of a power cord of the battery adapter assembly, and
   wherein the power cord of the battery adapter assembly enters the cord holding arrangement at a first end portion of the cord holding arrangement disposed proximate to the battery connection interface and exits the cord holding arrangement at a second end portion of the cord holding arrangement disposed at a rear portion of the power tool facing away from the tool.

14. The power tool according to claim 13, wherein the cord holding arrangement comprises a groove, wherein the cord holding arrangement comprises a first and a second end portion, and wherein at least one of the first and second end portions is configured to receive a fixation element of the power cord.

15. The power tool according to claim 14, wherein at least one of the first and second end portions is funnel-shaped.

16. The power tool according to claim 13, wherein the power tool comprises a first handle unit comprising a first grip portion, and wherein the cord holding arrangement is arranged on the first handle unit.

17. The power tool according to claim 16, wherein the first handle unit comprises a shield section arranged at a distance from the first grip portion, and wherein the cord holding arrangement is arranged on the shield section.

18. The power tool according to claim 17, wherein the cord holding arrangement is arranged on a side of the shield section facing away from the first grip portion.

19. The power tool according to claim 18, wherein the first grip portion comprises a throttle actuator arranged on a side of the first grip portion facing the shield section.

20. The power tool according to claim 16, wherein the first handle unit is a rear handle unit arranged at a rear portion of the power tool facing away from the tool.

21. The power tool according to claim 16, wherein the power tool comprises a main body comprising the electric motor, and wherein the first handle unit is pivotally attached to the main body.

22. The power tool according to claim 21, wherein the first handle unit is pivotally attached to the main body between a first and a second end position, and wherein the angle between the first and second end positions is at least 90 degrees.

23. The power tool according to claim 16, wherein the power tool comprises a second handle unit arranged at a position of the power tool between the first handle unit and the tool.

* * * * *